(12) United States Patent
Mainardi et al.

(10) Patent No.: US 11,204,476 B2
(45) Date of Patent: Dec. 21, 2021

(54) STORAGE TRAY FOR PROTECTING OPTICAL FIBERS MECHANICALLY COUPLED TO AN OPTOELECTRONIC DEVICE

(71) Applicant: ADVA OPTICAL NETWORKING SE, Meiningen (DE)

(72) Inventors: Richard Mainardi, Hudson (CA);
Benjamin Wohlfeil, Berlin (DE);
Rocco Matricardi, Stittsville (CA);
Scott Grindstaff, Cartersville, GA (US)

(73) Assignee: ADVA OPTICAL NETWORKING SE, Meiningen (DE)

( * ) Notice: Subject to any disclaimer, the term of this patent is extended or adjusted under 35 U.S.C. 154(b) by 0 days.

(21) Appl. No.: 17/019,608

(22) Filed: Sep. 14, 2020

(65) Prior Publication Data
US 2021/0088741 A1      Mar. 25, 2021

(30) Foreign Application Priority Data

Sep. 20, 2019   (EP) ..................................... 19198765

(51) Int. Cl.
*G02B 6/42*       (2006.01)
*G02B 6/44*       (2006.01)

(52) U.S. Cl.
CPC ......... *G02B 6/4478* (2013.01); *G02B 6/4261* (2013.01); *G02B 6/444* (2013.01); *G02B 6/4448* (2013.01); *G02B 6/42* (2013.01); *G02B 6/4278* (2013.01); *G02B 6/4452* (2013.01)

(58) Field of Classification Search
CPC ...... G02B 6/42; G02B 6/4261; G02B 6/4278; G02B 6/444; G02B 6/4448; G02B 6/4452; G02B 6/4478
See application file for complete search history.

(56) References Cited

U.S. PATENT DOCUMENTS 6,058,235 A *   5/2000   Hiramatsu ........... G02B 6/3897
                                                        385/135
6,249,634 B1    6/2001   Tenney
(Continued)

FOREIGN PATENT DOCUMENTS

JP        2006115341 A1    4/2006
WO        200207113 A1     1/2002

OTHER PUBLICATIONS

Extended European Search Report dated Jan. 10, 2020 in corresponding European Patent Application No. 19198765.0, filed Sep. 20, 2019, entitled Storage Tray for Protecting Optical Fibers Mechanically Coupled to an Optoelectronic Device.

*Primary Examiner* — Ryan A Lepisto
(74) *Attorney, Agent, or Firm* — Perry + Currier, Inc.

(57) ABSTRACT

The invention relates to a storage tray for protecting one or more optical fibers mechanically coupled to an optoelectronic device, characterized in that it is configured to be capable of coupling with the optoelectronic device, and comprising a fiber storage portion which is configured to receive and store the one or more optical fibers. The present invention also relates to an assembly comprising a storage tray according to the invention, and an optoelectronic device, wherein one or more optical fibers are coupled to the optoelectronic device, and wherein the one or more optical fibers are stored in the fiber storage portion of the storage tray.

10 Claims, 5 Drawing Sheets

(56) References Cited

U.S. PATENT DOCUMENTS

| | | | | |
|---|---|---|---|---|
| 6,741,785 B2* | 5/2004 | Barthel | ............... | G02B 6/4454 |
| | | | | 385/135 |
| 6,974,260 B2* | 12/2005 | Scheibenreif | ........ | G02B 6/4201 |
| | | | | 385/14 |
| 7,785,020 B2* | 8/2010 | Kim | .................... | G02B 6/4246 |
| | | | | 385/92 |
| 8,229,266 B2* | 7/2012 | Bleus | .................... | G02B 6/444 |
| | | | | 385/135 |
| 8,346,043 B2* | 1/2013 | Baum | ................ | G02B 6/4454 |
| | | | | 385/135 |
| 9,477,051 B2* | 10/2016 | Oki | ................... | H04B 10/5561 |
| 9,519,117 B2* | 12/2016 | Macall | .................... | G02B 6/43 |
| 9,743,546 B2* | 8/2017 | Oki | ........................... | G01J 1/44 |
| 9,871,590 B2* | 1/2018 | Matsui | ............... | H01S 3/06754 |
| 10,416,407 B2* | 9/2019 | Sakurai | ............... | G02B 6/4246 |
| 10,527,805 B2* | 1/2020 | Mizuno | ............... | G02B 6/4261 |
| 2004/0047581 A1* | 3/2004 | Tomino | ............... | G02B 6/4284 |
| | | | | 385/135 |
| 2020/0301088 A1* | 9/2020 | Hutchison | ........... | G02B 6/4448 |

* cited by examiner

STORAGE TRAY FOR PROTECTING OPTICAL FIBERS MECHANICALLY COUPLED TO AN OPTOELECTRONIC DEVICE

The present invention relates to a storage tray for protecting one or more optical fibers mechanically coupled to an optoelectronic device. The present invention further relates to an assembly comprising a storage tray according to the present invention, and an optoelectronic device.

Optical fibers connected to an optoelectronic device are components which are only stable to a certain extent. Optical fibers should e.g. not be bent beyond their minimum radius to prevent damage. However, such optoelectronic components are often subjected to a handling process at the manufacturer, during shipment to the customer, and all movements at the customer until completion of the implementation of the optoelectronic device into the final product.

Usually such optical fibers are therefore wrapped around a spool for transportation and handling purposes. Thereby, the wrapped fibers must be held in place under tension by a holding means, e.g. a clip, in order to prevent the fibers from unraveling. Such a spool wrapping of the optical fibers has different disadvantages, such as the following:

Care must be taken that the fibers are not bent beyond their minimum radius.

The optical fibers are exposed to the surrounding and may therefore be easily damaged by mechanical influences of the surrounding.

The exposed fibers are not protected against heat, e.g. heat resulting from a solder reflow process which is often necessary to implement the optoelectronic device into a final product.

That is, there is the need to provide a different solution which does not involve these disadvantages.

For this, the inventors of the present invention provide a storage tray for protecting one or more optical fibers mechanically coupled to an optoelectronic device. The storage tray according to the present invention is characterized in that it is configured to be capable of coupling with the optoelectronic device, and comprises a fiber storage portion which is configured to receive and store the one or more optical fibers. Further preferred embodiments are described herein.

The storage tray according to the invention enables the storage of optical fibers of different lengths of an optoelectronic device to be safely stored or transported, since the optical fibers are protected by the lateral walls of the storage tray, i.e. are essentially not exposed to the surrounding. Furthermore, the storage tray according to the present invention is able to hold the wrapped optical fibers by the lateral walls in a specific radius, i.e. the fibers are not wrapped around a spool, and it is therefore not necessary to hold them by a clip under tension. In doing so, the storage tray according to the present invention provides an easy-to-handle and fiber-preserving method of encapsulating optical fibers. This offers fiber protection during manual and machine handling of the optoelectronic device and during transportation of the product to the end user as well as a clean top surface that lends itself to pick and place vacuum chuck holders. The storage tray according to the present invention provides protection over the entire fiber length of the optoelectronic device. The storage tray allows the operator to store the fibers straight away once the fibers have been attached to the storage tray. The tray remains in place all the way through shipping and handling, and until the end user has completed solder reflowing of the optoelectronic device.

The optoelectronic device may be any optoelectronic device comprising electrical connecting means and one or more optical fibers, such as a ball grid array. The optoelectronic device is preferably a plate-like optoelectronic device. At the bottom surface (in the plane spanned by the x- and y-axes (FIG. 1)) of the optoelectronic device, the electrical connecting means are preferably located, wherein it is preferred that the upper surface (opposite the bottom surface) is free from electrical means. At one of the lateral surfaces (in the plane essentially vertical to the plane spanned by the x- and y-axes), a fiber exit port preferably extends from which the one or more fibers exit the interior of the optoelectronic device.

According to a further embodiment of the storage tray according to the invention, the storage tray further comprises a fiber receiving portion and a fiber redirecting portion. The fiber receiving portion is preferably present for receiving the optical fiber into the housing of the storage tray. The fiber directing portion has the function of redirecting the optical fiber into the fiber storage portion, in which the optical fiber may be present in a wrapped form.

In a further embodiment, it is preferred that the storage tray according to the present invention has a bottom side which is configured to be coupled with the afore-mentioned upper side of a (plate-like) optoelectronic device. That is, in the coupled state of the storage tray and the optoelectronic device, the bottom side of the storage tray and the upper side of the optoelectronic device are parallel to each other. This arrangement has the advantage that space for storing the optical fiber may be saved compared to e.g. a case in which the optical fiber is stored in the extension direction of the (plate-like) optoelectronic device.

According to a further embodiment of the storage tray of the present invention, it is preferred that the fiber receiving portion extends further downwards with respect to the bottom side, having a coupling surface facing a lateral surface of the plate-like optoelectronic device. In this case, the lateral surface is that lateral surface which comprises the fiber exit port. In doing so, the optical fiber may be protected from the exit throughout its entire extension. It is further preferred that the coupling surface of the storage tray comprises a fiber receiving opening. The fiber receiving opening is preferably configured such that it corresponds with the laterally extending fiber exit port at the lateral surface of the (plate-like) optoelectronic device, thereby being configured to fix the position of the storage tray with respect to the optoelectronic device.

In a further embodiment, it is preferred that the fiber receiving portion of the storage tray according to the present invention has a further opening on the side opposite to the fiber receiving opening. This has the advantage that the storage tray may laterally approach the optoelectronic device from the side of the fiber exit port in that the optical fiber in a linear extension state may be guided through the fiber receiving portion where it enters at the fiber receiving opening and where it exits through the further opening. The further opening is preferably configured such that the part of the optical fiber which exits the fiber receiving portion may be guided back into the housing of the storage tray.

It is preferred that the fiber receiving portion and the fiber redirecting portion are adjacent to each other. At least a part of the side walls of the fiber redirecting portion has preferably a round side surface. Such a round side surface is configured to redirect the one or more optical fibers into the fiber storage portion which is adjacent to the fiber redirecting portion and adjacent to the bottom side. The fiber storage portion may have an essentially round lateral wall configured to store the one or more optical fibers in a wound state.

The storage tray according to the present invention may have one or more fixing means configured to fix the bottom side at the upper side of the plate-like optoelectronic device. The fixing means may be of any nature as long as it fulfills its function, namely, preferably fixing both components reversibly together. The fixing means may be a clip mechanism, but may also be screw or bolt (using the term "screw" herein is always referred to "screw or bolt") which corresponds to a screw thread present at the optoelectronic device.

Moreover, the fiber storage portion may have one or more fiber retaining means being located at the upper side of the fiber storage portion, and being configured to retain the one or more optical fibers in the fiber storage portion. The fiber retaining means is preferably in the form of a protrusion located at the upper side of the storage tray, extending in a direction parallel to the plane of the bottom side. The fiber retaining means has the advantage that the optical fibers may be held in the wrapped state even if the upper side of the storage is not covered by a cover plate.

In a further embodiment of the storage tray according to the present invention, it is preferred that the round lateral wall of the fiber storage portion has a lateral opening. The lateral opening may have the form of a slit which extends in the direction of the z-axis. This slit preferably extends over the entire width of the round lateral wall and is open at that side of the round lateral wall that is at the upper side of the storage tray. The lateral opening in the form of a slit has the function of facilitating the movement of the optical fibers towards the upper side of the storage tray if removal of the optical fibers is desired. Fiber movement towards the upper side of the storage tray may be achieved by using a removal aid, e.g. in the form of a finger which may be put in between the optical fibers and the bottom side of the storage tray. For reasons of protecting the optical fibers from being damaged by the removal aid, the lateral opening may continue into the bottom plate at the bottom side of the storage tray.

However, the storage tray according to the present invention may also comprise a cover plate which is located on the upper side of the storage tray, the upper side being on the side opposite the bottom side of the storage tray. The cover plate may be of advantage if the storage tray is to be entirely closed, e.g. for reasons of heat protection of the encapsulated optical fibers.

The storage tray according to the present invention may be made of metal or plastic, wherein plastic, i.e. a heat-resistant plastic, is more preferred from the standpoint of heat protection of the optical fibers. Heat protection of the optical fibers may then be an issue, if the optoelectronic device is e.g. a ball grid array which is installed by a solder reflow process. Alternatively (or additionally), the storage tray may be coated with a heat resistant material to further protect the optical fibers during high temperature solder reflow processes.

The present invention further relates to an assembly which comprises the storage tray according to the present invention, and an optoelectronic device, wherein one or more optical fibers are coupled to the optoelectronic device, and wherein the one or more optical fibers are stored in the fiber storage portion of the storage tray. All features mentioned in connection of the storage tray according to the present invention are possible features of the assembly according to the present invention. In the assembly according to the present invention, it is preferred that the optoelectronic device comprises electrical connecting means at the bottom side of the optoelectronic device. It is further preferred that the optoelectronic device is a plate-like optoelectronic device having a fiber exit port in one of its lateral surfaces.

The present invention is further explained with reference to the following FIGS. 1 to 6 which should, however, only be understood as exemplary and non-limiting for the scope of the present invention:

FIG. 4b shows the side view of an assembly according to the present invention cut at the intersection A-A shown in FIG. 4a;

Figure 1:
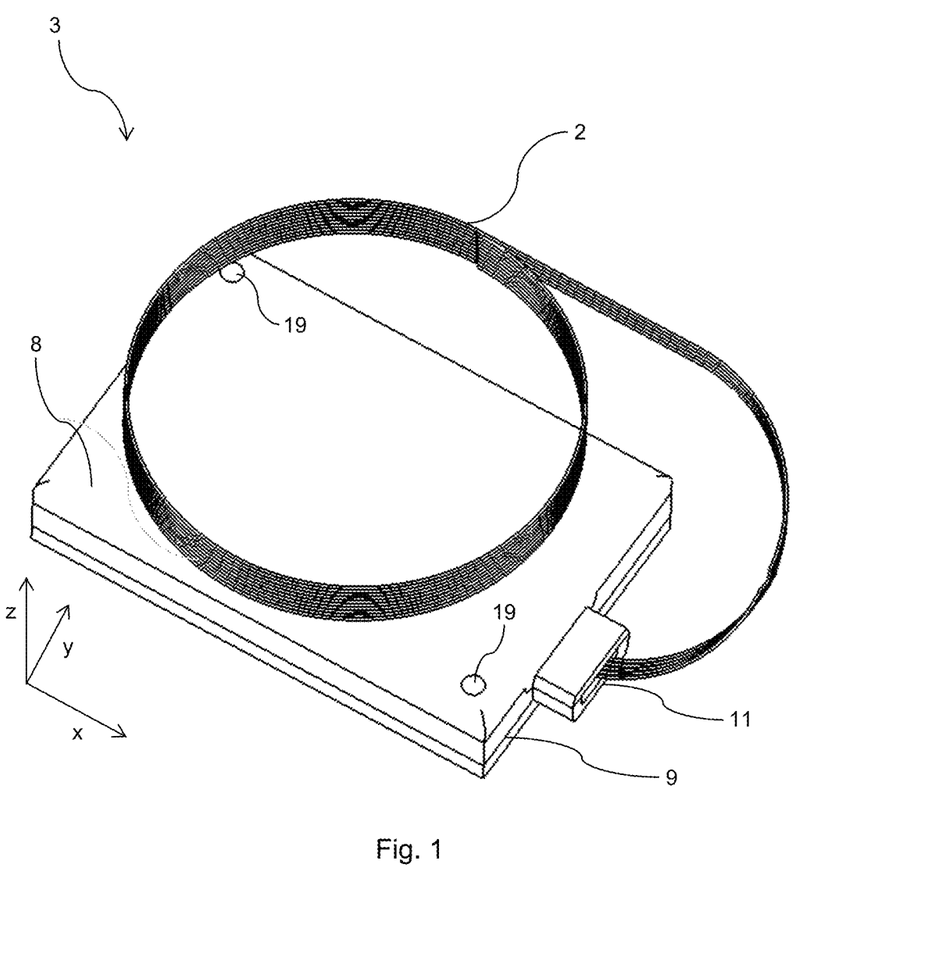
FIG. 1 shows an optoelectronic device according to the prior art to which optical fibers are mechanically coupled.

FIG. 1 shows an optoelectronic device 3 according to the prior art to which optical fibers 2 are mechanically coupled. The device 3 is only shown for reasons of better understanding the interaction with the storage tray according to the invention. FIG. 1 shows the optoelectronic device 3 as a plate-like optoelectronic device having an upper side 8 which may be coupled with the bottom side 7 (see FIG. 2, 4b, or 5) of a storage tray according to the invention. For this reason, the optoelectronic device 3 may comprise fixing means 19, e.g. in the form of screw threads to which the storage tray may be connected using corresponding screws. The upper side 8 extends in a plane parallel to a plane spanned by the x- and y-axes. The device 3 also comprises a fiber exit port 11, preferably at the lateral surface 9 of the plate-like device 3, through which the optical fibers 2 are leaving the casing of device 3. The lateral surface 9 extends in a plane parallel to a plane spanned by the y- and z-axes.

Figure 2:
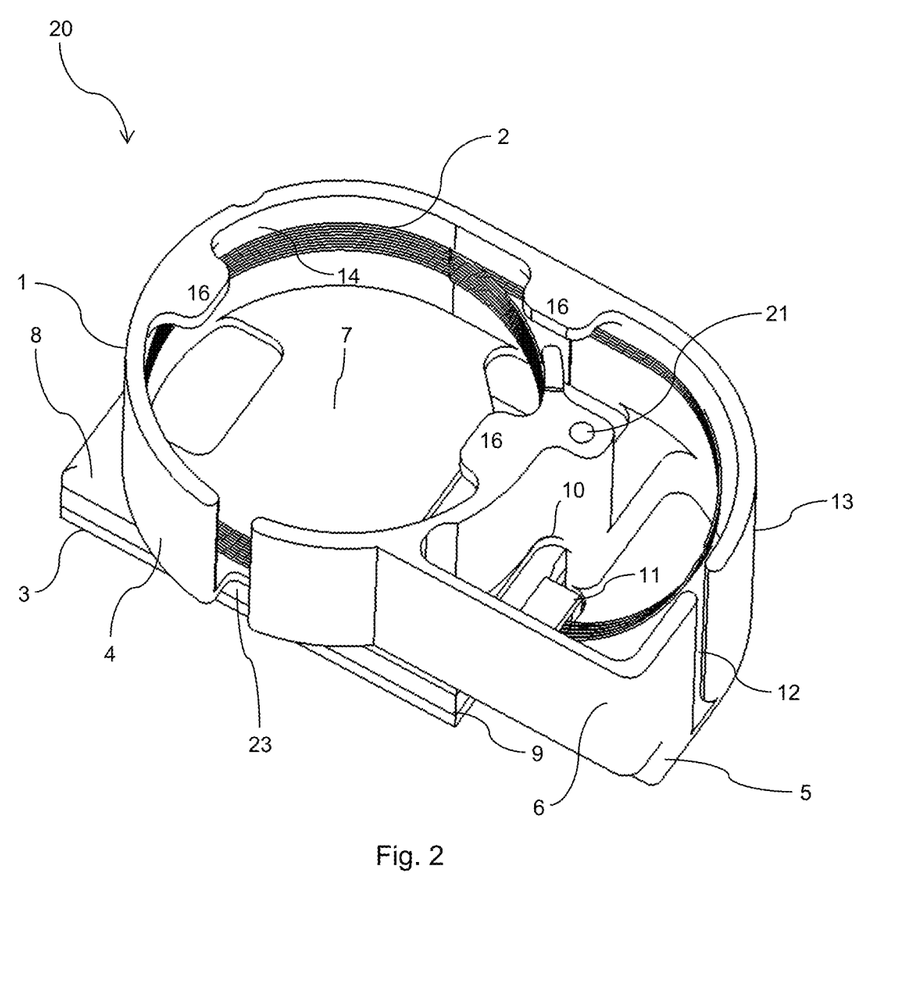
FIG. 2 shows an assembly according to the present invention comprising the optoelectronic device shown in FIG. 1 having coupled thereon a storage tray according to the present invention.

FIG. 2 shows an assembly 20 according to the present invention comprising the optoelectronic device 3 shown in FIG. 1 having coupled thereon a storage tray 1 according to the present invention. The one or more optical fibers 2 leaving the fiber exit port 11 at the lateral surface 9 of the optoelectronic device 3 enter through a fiber receiving opening 10 of the fiber receiving portion 5 of the storage tray 1. The fiber receiving opening 10 preferably has a size that corresponds with the size of the fiber exit port 11. This has the advantage that the storage tray may not be shifted in the directions of the y-axis and the z-axis. From the fiber receiving portion 5, the optical fibers 2 run upwards (in direction of z-axis) into the fiber redirecting portion 6. The fiber redirecting portion 6 has at one side a wall with a round side surface 13 which allows the fibers to be redirected essentially in the direction opposite the direction in which they exit the fiber exit port 11, without being bent beyond their minimum bend radius. From the fiber receiving portion 5, the optical fibers 2 may reach the fiber storage portion 4 which may allow the optical fibers 2, depending on their length, to be wrapped along the round lateral wall 14 once or several times. The fiber storage portion 4 may have one or more fiber retaining means 16 which are located at the upper side (opposite the bottom side 7) of the fiber storage portion 4, and are configured to retain the one or more optical fibers 2 in the fiber storage portion 4. As shown in FIG. 2, the fiber retaining means 16 may extend from the upper side of the round lateral wall 14 in a plane parallel to the plane spanned by the x- and y-axes. FIG. 2 shows the fiber storage portion 4 adjacent to the upper side 8 of the optoelectronic device 3, which has the advantage that the resulting assembly 20 is very compact, the latter one being possible since the upper side 8 of the optoelectronic device 3 is coupled to the bottom side 7 of the storage tray 1. Furthermore, the round lateral wall 14 of the fiber storage portion 4 may have a lateral opening 23, preferably in the form of a slit which extends in the direction of the z-axis. This slit preferably extends over the entire width of the round lateral wall 14 and is open at that side of the round lateral wall 14 that is at the upper side of the storage tray 1. The lateral opening 23 in the form of a slit has the function of facilitating the movement of the optical fibers 2 towards the upper side of the storage tray 1 if removal of the optical fibers 2 is desired. Fiber movement towards the upper side of the storage tray 1 may be achieved by using a removal aid, e.g. in the form of a finger which may put in between the optical fibers 2 and the bottom side 7. For reasons of protecting the optical fibers of being damaged by the removal aid, the lateral opening 23 may continue into the bottom plate at the bottom side 7 of the storage tray 1.

Figure 3:
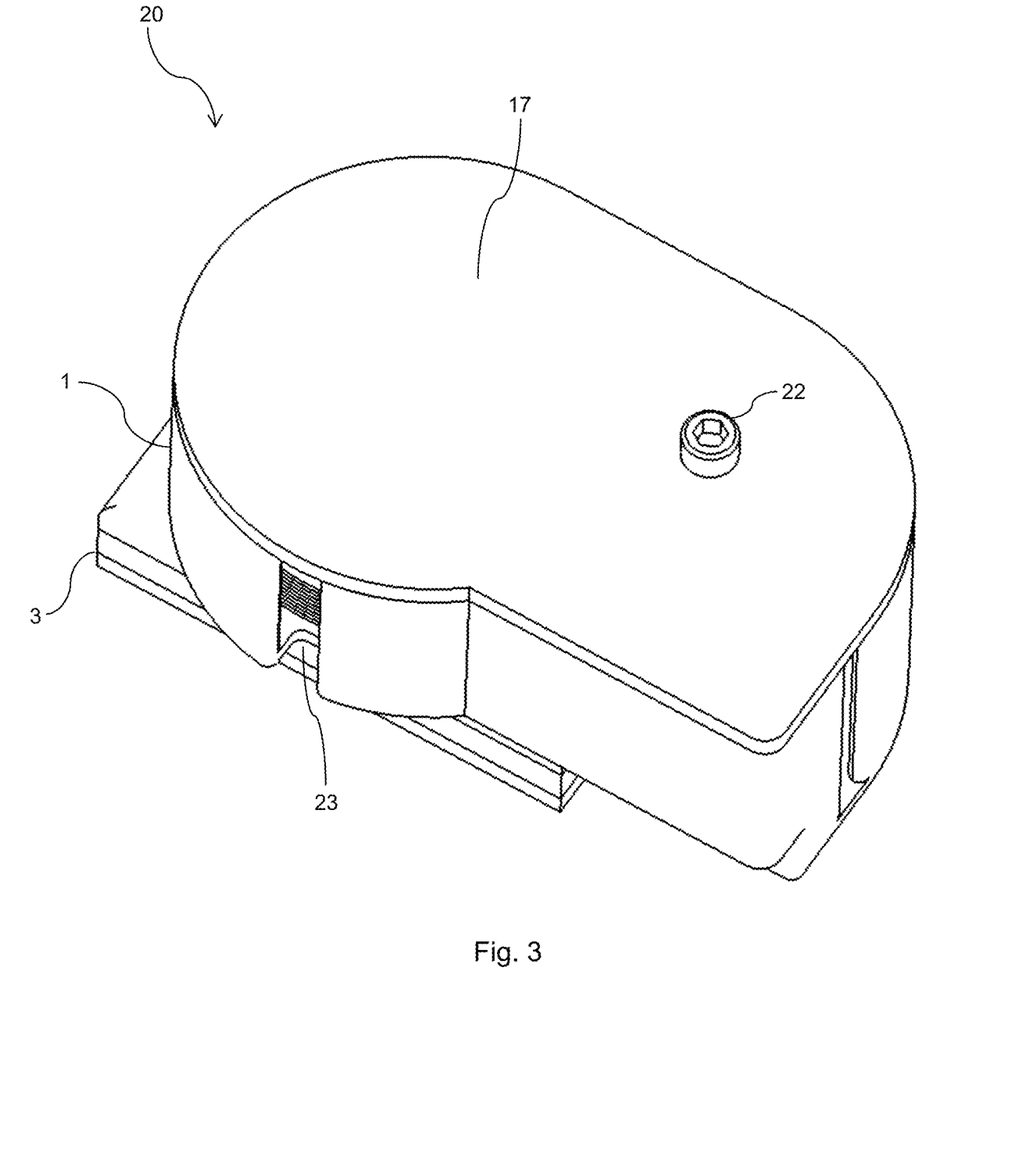
FIG. 3 shows the same assembly of FIG. 2 having the upper side closed with a cover plate.

FIG. 3 shows the assembly of FIG. 2, wherein the upper side of the storage tray 1 is covered with a cover plate 17, e.g. by means of a fixing screw 22 which is configured to correspond to the screw thread 21.

Figure 4A:
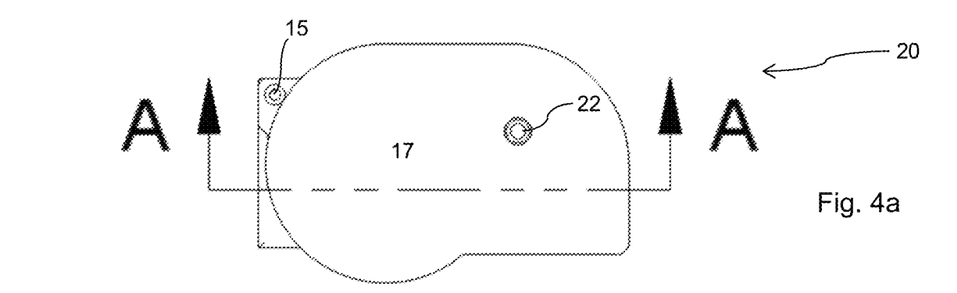
FIG. 4a shows the top view of an assembly according to the present invention.
Figure 4B:
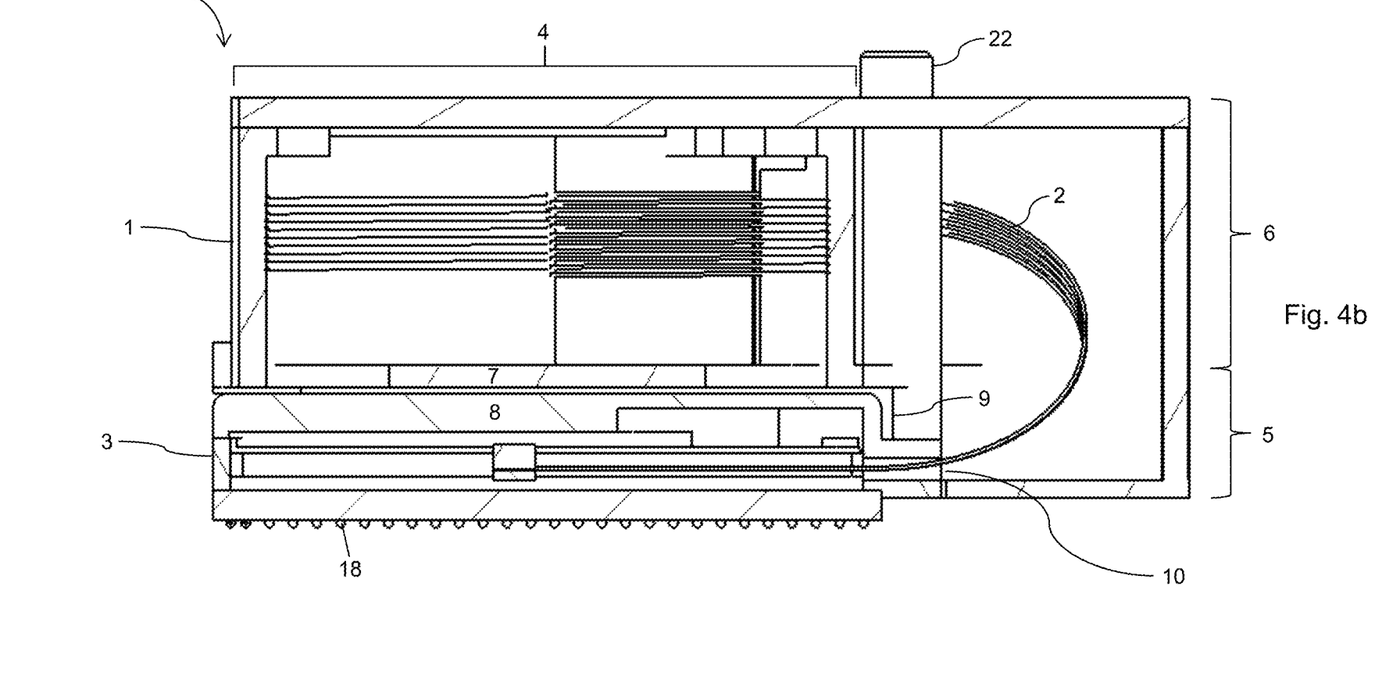

FIG. 4a shows the top view of an assembly 20 wherein the storage tray 1 is fixed to the optoelectronic device 3 via the fixing means 15, and has a cover plate 17 covering the upper side of the storage tray 1. FIG. 4a mainly serves the purpose of illustrating at which intersection A-A the assembly 20 is cut for the side view shown in FIG. 4b. That is, FIG. 4b shows the side view of an assembly according to the present invention cut at the intersection A-A shown in FIG. 4a. Apart from the different view, the assembly 20 shown in FIG. 4a is the same as shown in FIGS. 2 and 3. The optoelectronic device 3 shown in FIG. 3b is a ball grid array having ball grids at its bottom side (opposite the upper side 8) as electrical connecting means 18.

Figure 5:
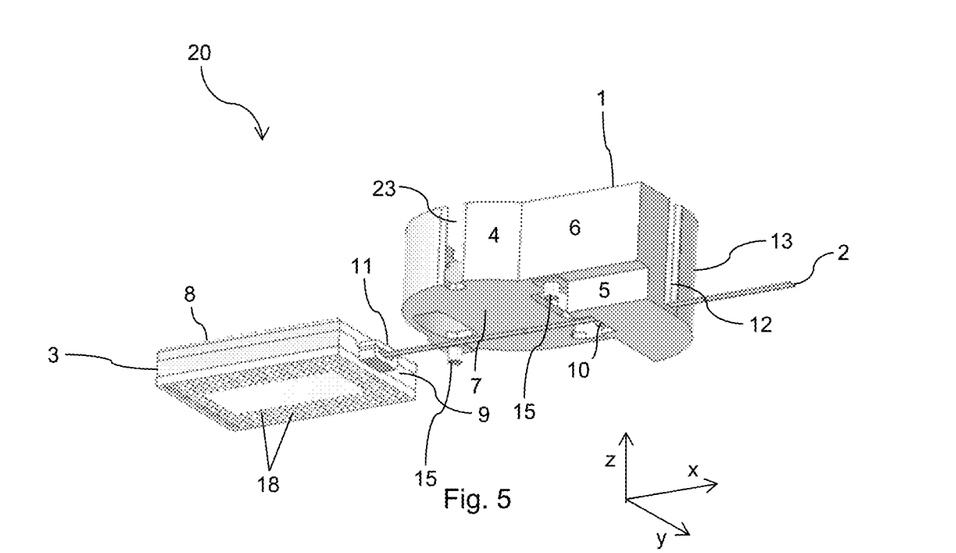
FIG. 5 shows how a storage tray according to the present invention may approach an optoelectronic device before finally being coupled and before the optical fiber is inserted into the storage tray.

FIG. 5 shows how a storage tray 1 may approach the optoelectronic device 3 before finally being coupled and before the optical fibers 2 are inserted into the storage tray 1. For mounting the storage tray 1 on the optoelectronic device 3, the optical fibers 2 must be threaded into the storage tray 1 through the fiber receiving opening 10, and afterwards bent into the direction of the fiber storage portion 4. If the optical fibers 2 have a certain length, it is not at the same time possible to insert them into the fiber receiving opening 10 and to bend them into the directions of the fiber storage portion 4. Therefore, the storage tray 1 may comprise a further opening 12 at the side opposite the fiber receiving opening 10. This further opening 12 allows to pass the optical fibers 2 in linear direction through the fiber receiving portion 5 while the storage tray 1 approaches the optoelectronic device 3 in the direction of the x-axis. The further opening 12 is preferably configured as a slit being open at the upper side of the storage tray 1. This is necessary for the insertion of that part of the optical fiber 2 that exits the further opening 12 after the storage tray 1 is in the final position on the optoelectronic device 3. As shown in FIG. 5, the storage tray 1 may comprise fixing means 15 in a position complementary to the fixing means 19 of the optoelectronic device 3 (as shown in FIG. 1). In doing so, the storage tray 1 may also be held in its position on the optoelectronic device 3 in the direction of the x-axis.

Figure 6:
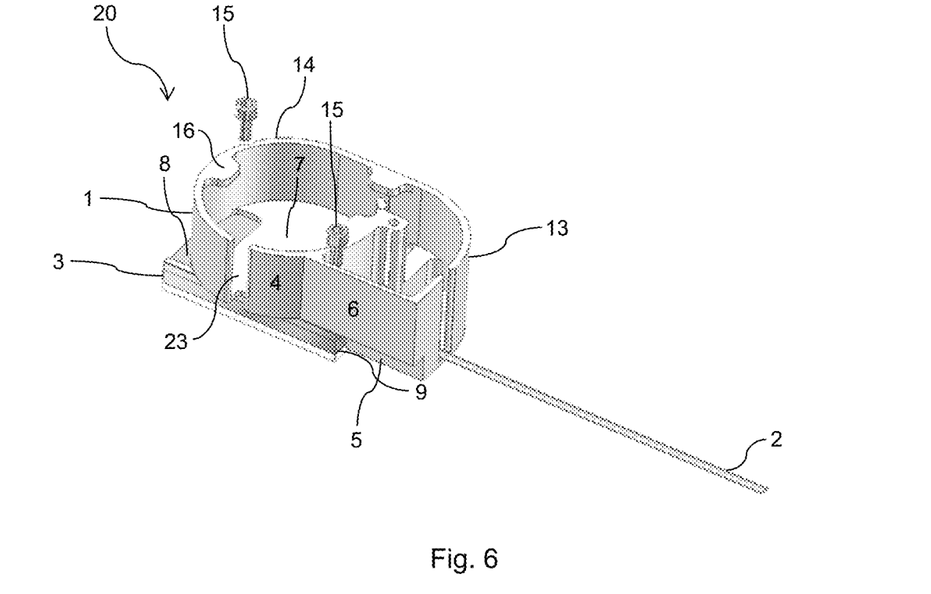
FIG. 6 shows an assembly according to the present invention wherein the fixing means are not yet fixed and the optical fiber is not yet inserted into the storage tray.

FIG. 6 shows an assembly 20 wherein the storage tray 1 is brought in the final position with respect to the x-axis. The fixing means 15 are not yet fixed for the reason of illustrating their possible position. Furthermore, in FIG. 6 the optical fibers 2 are not yet inserted into the fiber storage portion 4, as they are in FIG. 2.

LIST OF REFERENCE SIGNS 1 storage tray
2 optical fibers
3 optoelectronic device
4 fiber storage portion
5 fiber receiving portion
6 fiber redirecting portion
7 bottom side
8 upper side
9 lateral surface
10 fiber receiving opening
11 fiber exit port
12 further opening
13 round side surface
14 round lateral wall
15 fixing means (storage tray)
16 fiber retaining means
17 cover plate
18 electrical connecting means
19 fixing means (optoelectronic device)
20 assembly
21 screw thread for fixing the cover plate
22 fixing screw
23 lateral opening

The invention claimed is:

1. A storage tray for protecting one or more optical fibers mechanically coupled to an optoelectronic device, the storage tray comprising:
   a fiber storage portion configured to receive and store the one or more optical fibers,
   wherein the storage tray is configured for coupling with the optoelectronic device;
   a fiber receiving portion and a fiber redirecting portion;
   a bottom side configured to be coupled with an upper side of a plate-like optoelectronic device,
   wherein the fiber receiving portion extends further downwards with respect to the bottom side, having a coupling surface facing a lateral surface of the plate-like optoelectronic device,
   wherein the coupling surface has a fiber receiving opening,
   wherein the fiber receiving opening is configured to correspond with a laterally extending fiber exit port at the lateral surface of the plate-like optoelectronic device, thereby being configured to fix the position of the storage tray with respect to the optoelectronic device.

2. The storage tray according to claim 1, wherein the fiber receiving portion has a further opening at the side opposite the fiber receiving opening.

3. The storage tray according to claim 1, wherein the fiber receiving portion and the fiber redirecting portion are adjacent to each other, the fiber redirecting portion having a round side surface configured to redirect the one or more fibers into the fiber storage portion which is adjacent to the fiber redirecting portion and adjacent to the bottom side.

4. The storage tray according to claim 1, wherein the fiber storage portion has an essentially round lateral wall configured to store the one or more optical fibers in a wound state.

5. The storage tray according to claim 1 further comprising one or more fixing means configured to fix the bottom side at the upper side of the plate-like optoelectronic device.

6. The storage tray according to claim 1, wherein the fiber storage portion has one or more fiber retaining means being located at the upper side of the fiber storage portion, and being configured to retain the one or more optical fibers in the fiber storage portion.

7. The storage tray according to claim 1, further comprising a cover plate located on the upper side of the storage tray, the upper side being opposite to the bottom side of the storage tray.

8. An assembly comprising a storage tray according to claim 1, and an optoelectronic device, wherein one or more optical fibers are coupled to the optoelectronic device, and wherein the one or more optical fibers are stored in the fiber storage portion of the storage tray.

9. The assembly according to claim 8, wherein the optoelectronic device comprises electrical connecting means at the bottom side of the optoelectronic device.

10. The assembly according to claim 8, wherein the optoelectronic device is a plate-like optoelectronic device having a fiber exit port at one of the lateral surfaces.

\* \* \* \* \*